Patented Sept. 21, 1948

2,449,613

UNITED STATES PATENT OFFICE 2,449,613

REACTIONS OF INORGANIC POLYISOCYANATES AND POLYISOTHIOCYANATES

Henry Charles Miller, Claymont, and Burt Carlton Pratt, Wilmington, Del., assignors to E. I. du Pont de Nemours & Company, Wilmington, Del., a corporation of Delaware No Drawing. Application June 17, 1943, Serial No. 491,220

18 Claims. (Cl. 260—22)

This invention relates to organic compositions and to their modification with inorganic agents.

The modification of organic compositions with organic polyisocyanates and polyisothiocyanates produces many varied and important improvements in properties. The process is accompanied, however, by certain disadvantages. In some cases relatively large amounts of modifier are required to produce a desired effect and as a result the solutions show a decided tendency to gel. Also certain polymeric organic films rendered insoluble by the organic polyisocyanates show a serious sacrifice in flexibility.

The invention has as an object the improvement of monomeric and polymeric organic materials. Another object is a process whereby these materials can be improved by means of a relatively small amount of modifier. A further object is the modification of the solubility of polymeric organic material without undue sacrifice in flexibility. A further object is the preparation of new polymeric materials. Other objects will appear hereinafter.

These objects are accomplished by the following invention wherein an organic material, monomeric or polymeric, having a plurality of groups containing active hydrogen is reacted with an inorganic compound having a plurality of —NCX groups wherein X is a chalcogen of atomic weight less than 33 attached to an acidic-hydroxide-forming, inorganic, polyvalent element, i. e., with a polyisocyanate or polyisothiocyanate of such an element. These inorganic poly-NCX compounds being inorganic are free from carbon other than that of the —NCX group.

The preferred method for modifying a polymeric organic compound containing a plurality of groups containing active hydrogen is to dissolve it in a solvent free from active hydrogen, such as a hydrocarbon, ester, ketone, or ether, and stir in at room temperature the desired amount of modifier. The mixture is then ready for whatever use is intended such as for preparing films, fibers, elastic materials, etc. The systems must be substantially anhydrous since the isocyanate and isothiocyanate modifiers react with water.

The more detailed practice of the invention is illustrated by the following examples, wherein parts given are by weight. There are of course many forms of the invention other than these specific embodiments:

Example I

A mixing device was charged with 1000 parts of a 50% solution in Hi-flash naphtha of a glyceryl phthalate resin modified with 40% coconut oil. There was added 400 parts of Hi-flash naphtha and 25 parts of silicon tetraisocyanate. After mixing thoroughly at room temperature, the product was ready for use as a coating composition. It was compared with a coating composition prepared in the same manner except that 25 parts of hexamethylene diisocyanate was used instead of silicon tetraisocyanate. The comparison consisted in spraying these compositions on separate steel panels and observing the rate of drying and the properties of the resultant coatings. The composition containing the inorganic modifier dried faster than that containing the organic modifier and after overnight drying was harder, freer from surface tack, and less affected by water (immersion for 4 hours). As a test of the stability of the coating solutions, portions of each were heated to 100° C. After 2 hours' heating the silicon tetraisocyanate modified composition was still quite fluid, while the composition modified with hexamethylene diisocyanate was a soft gel. Preparations containing sufficient organic polyisocyanate to equal the drying properties described above for the composition containing the inorganic polyisocyanate showed even poorer stability, gelling in many cases in less than 30 minutes at 100° C.

In addition to its excellent drying qualities and its stability in solution, the coconut oil alkyd resin/silicon tetraisocyanate composition showed outstanding durability on exposure outdoors on steel substrates, being very much superior to 40–60% drying oil alkyds in resistance to rusting, blistering, and cracking, and in retention of gloss.

Example II

A closed mixing device was charged with 90 parts of cellulose acetate (54.5% combined acetic acid), 10 parts of phosphorous triisothiocyanate, and 566 parts of substantially anhydrous acetone. The mixer was operated slowly at room temperature until the contents were homogeneous, after which the material was ready for use in preparing fibers or films. The unusual nature of the composition was demonstrated by casting a film on a glass plate and allowing the acetone to evaporate very slowly. When the solvent was removed, a clear film 2.5 mils in thickness was obtained. The film was removed from the glass plate and placed for 90 minutes in an oven heated at 160° C. The resultant film was found to be insoluble in acetone, whereas before baking it was readily soluble in acetone. Despite this insolubilization, the flexibility (as measured by number of sharp flexes the material withstood before breaking) of the baked film was almost as good as that of an unmodified cellulose acetate control. Other known methods of insolubilization such as modification with 10% hexamethylene diisocyanate gave flexibilities after baking which were considerably less. The coating solution modified with the inorganic derivative was stable at room temperature for a longer time than a similar solution containing hexamethylene diisocyanate in place of the phosphorous triisothiocyanate.

Fibers were spun from the cellulose acetate-phosphorous triisothiocyanate composition and baked at 160° C. for 90 minutes. Fabrics prepared from these fibers were characterized by a high degree of flexibility combined with outstanding resistance to dry cleaning solvents and to damage by ironing.

When Example II was repeated using silicon tetraisocyanate in place of phosphorous triisothiocyanate, similar results were obtained.

The process of this invention is also applicable to the preparation of new polymeric materials by reacting a monomeric organic material having a plurality of groups containing active hydrogen with inorganic polyisocyanates and polyisothiocyanates. This is illustrated by Example III below:

*Example III*

One hundred ninety-six parts of silicon tetraisocyanate was added to a reaction vessel containing 62 parts of ethylene glycol, and the mixture stirred immediately. An exothermic reaction occurred. The mixture was then heated and a clear melt thereby obtained. On cooling the reaction mixture, a solid organosilicon substance separated. This substance was insoluble in toluene and essentially infusible. When this substance was heated for 5 minutes with 20 parts of a solution of a 50% soya oil-modified alkyd resin at 150° C., a portion of the silicon-containing substance went into solution and the viscosity of the solution was markedly increased. When the same alkyd resin solution was heated for 5 minutes at 150° C. in the absence of the silicon compound, there was no noticeable increase in viscosity.

The invention is generically applicable to the reaction of monomeric or polymeric organic materials having a plurality of groups containing active hydrogen, as determined by the Zerewitinoff method, with an inorganic polyisocyanate or polyisothiocyanate of an inorganic element of group IV and V of the periodic system having atomic weights between 28 and 122 and of these the —NCX compounds of group IV having atomic weights between 28 and 50, i. e., silicon and titanium, are particularly preferred. Illustrative isocyanates and isothiocyanates which may be employed in the process of this invention are: arsenic triisocyanate, titanium tetraisothiocyanate, and antimony pentaisocyanate.

The inorganic polyisocyanate or polyisothiocyanate may be manufactured by any suitable method. For example, silicon tetraisocyanate or phosphorous triisocyanate may be prepared from silver isocyanate and silicon tetrachloride or phosphorous trichloride, respectively, as described in J. Am. Chem. Soc., 62, 761 (1940). Phosphorus triisothiocyanate may be prepared from phosphorous trichloride and lead thiocyanate as described in J. Chem. Soc., 79, 541 (1901).

In the process of this invention there can be employed any organic material having a plurality of groups containing active hydrogen. Suitable materials include castor oil; heat bodied or blown linseed, China-wood, or other unsaturated glyceride oils; drying oil varnishes, e. g., those containing linseed or China-wood oil and a resin, such as a natural resin or a phenol-formaldehyde resin; factices; polyhydric alcohol-polybasic acid resins either unmodified or modified with saturated or unsaturated monobasic acids, e. g., rosin, linseed oil acids and soya oil acids; polyhydric alcohol-polybasic acid resins modified with monohydric alcohols; nylons, e. g., polyhexamethylene adipamide; polyester-amides, e. g., those derived from ethanolamine and adipic acid or from hexamethylenediamine, ethylene glycol, and adipic acid; proteins; polyvinyl alcohol; partially hydrolyzed polyvinyl acetate; hydrolyzed interpolymers of vinyl esters with other materials; polyvinyl acetals or ketals, e. g., polyvinyl formal; polymers or interpolymers of acrylic or methacrylic acid; hydrolyzed polyvinyl thiolacetate and its interpolymers; amide-aldehyde resins, e. g., urea-formaldehyde resins; amine-formaldehyde resins; phenol-formaldehyde resins; active hydrogen-containing rubbers, e. g., rubber-aldehyde reaction products; cellulose; starch; cellulose ethers or esters, e. g., ethyl cellulose, benzyl cellulose and cellulose propionate; aldehyde resins; polymerized rosin and its derivatives; natural resins, such as shellac, Kauri, and amber; sulfur-phenol and sulfur-amine resins; polyhydric alcohols, e. g., hexamethylene glycol, glycerol and sorbitol; polycarboxylic acids, e. g., adipic and sebacic acids; polythiols, e. g., decamethylene dithiol; polythiophenols, e. g., p-dithiophenol; polyamine, e. g., hexamethylenediamine and 2,2'-diaminodiethyl sulfide; amino alcohols, e. g., ethanolamine and 6-aminohexanol; amino acids, e. g., 6-aminocaproic acid; hydroxyacids, e. g., hydroxyacetic and 10-hydroxydecanoic acid; and polyhydric phenols, e. g., resorcinol and diphenylolpropane. In reacting the inorganic poly-NCX compounds with monomeric materials it is desirable to use larger amounts of the poly-NCX compounds than in the case of polymeric active hydrogen-containing materials. Preferably in the case of monomeric materials the reactants are used in approximately chemically equivalent portions. If an insoluble product is desired, the poly-NCX compound is used in slight excess. For many purposes, it is advantageous to use combinations of two or more monomeric or polymeric materials. Functional groups containing active hydrogen include: carboxyl, thiocarboxyl, hydroxy, thiol, active methylene, and amino or amido containing at least one hydrogen atom. Compounds, polymeric or monomeric, having a plurality of hydroxyl groups are particularly desirable for reaction with the inorganic isocyanate or isothiocyanate because of their availability and the desirable properties of the reaction products. Because of the stability of the polymeric polyhydric organic material—inorganic poly-NCX compositions—these are particularly preferred.

The polymers treated in accordance with this invention can contain modifying agents, e. g., pigments, plasticizers, inhibitors, metallic driers, catalysts, solvents and diluents.

The conditions under which the reaction between the active hydrogen-containing material and the inorganic polyisocyanate or polyisothiocyanate is conducted can vary widely. The temperature used depends on the type of material reacting and the time required for completion. For example, amine resins, such as an aniline-formaldehyde resin, react very vigorously with polyisocyanates and consequently it is frequently necessary to cool solutions of these resins below room temperature before adding the polyisocyanate in order to moderate the reaction. Polymeric amides, such as nylons, on the other hand, are much less reactive and require elevated temperatures to cause the reaction with the polyisocyanate to take place in a reasonable length of time. In general, the temperatures used will be between 20 and 200° C. but temperatures can be used up to the limit of thermal stability of the compositions, which will generally be about 300° C. It is preferred to operate under atmospheric pressure, however, in certain cases it may be advantageous to operate under superatmospheric or subatmospheric pressures.

Only a very small amount of the inorganic polyisocyanate or polyisothiocyanate is required to bring about a modification of the active hydrogen-containing material. In general, however, amounts ranging from 0.5 to 10% of the active hydrogen-containing polymeric material are used.

The method of modifying a polymeric material with the polyisocyanate or polyisothiocyanate can be varied widely depending on the type of polymeric material and its intended use. In most cases, it is sufficient simply to add the modifier to a solution of the polymeric material. The resulting solution can then be heated to effect the reaction in solution, or the solution can be used immediately to prepare films, fibers, impregnated compositions, elastic materials, and the like followed by heating if desired to effect the reaction in bulk. Other methods for bringing the polymeric material and the modifier together include immersing a preformed unmodified fiber or fabric in a solution of a polyisocyanate or a polyisothiocyanate; brushing, dipping, or spraying a film of unmodified resinous material with a solution of the modifier, immersing a massive polymer, such as a molded article, in a solution of the modifier to secure modification at or near the surface of the article, or incorporating the modifier in a heat- or plasticizer-softened polymer such as for example by milling on rubber rolls. The invention is likewise intended to cover processes in which the modifier is generated in situ.

The compositions of this invention are useful per se or admixed with other materials as coating, fiber-forming and molding compositions, impregnants, elastic materials, and adhesives.

Products prepared according to the process of this invention contain in combination the reaction residue of an organic compound containing a plurality of groups containing active hydrogen and an inorganic compound having a plurality of —NCX groups, where X is a chalcogen of atomic weight less than 33. Although the structure of the products is not known with certainty, it is believed that these products contain groups of the following structure:

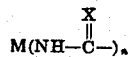

where M represents the inorganic element and $n$ represents its valence. The carbon in the above group is attached to the residue of the active hydrogen-containing compound. The manner in which the carbon is attached depends upon the particular active hydrogen-containing compound used. If the active hydrogen-containing compound is an hydroxyl compound, this carbon will be attached to a urethane oxygen, and if the active hydrogen-containing compound is an amino compound, this carbon will be attached to an amido nitrogen. On this basis the products obtained from hydroxyl compounds are polyurethanes or polythiourethanes containing the element M; those obtained from amino compounds are polyureas or polythioureas containing the element M; and those obtained from carboxyl compounds are polyamides or polythioamides containing the element M.

The above description and examples are intended to be illustrative only. Any modification of or variation therefrom which conforms to the spirit of the invention is intended to be included within the scope of the claims.

What is claimed is:

1. Process for improving vegetable oil modified alkyd resins containing a plurality of groups containing active hydrogen which comprises reacting the same, in an essentially anhydrous system, at 20—200° C. with from 0.5 to 10%, based on the weight of the same, of silicon tetraisocyanate.

2. The product of the reaction, in an essentially anhydrous system, of an alkyd resin containing a plurality of groups containing active hydrogen and from 0.5 to 10%, based on the weight of the same, of an inorganic compound having all the valences of an acidic-hydroxide-forming, polyvalent, inorganic element of groups IV and V of the periodic system and of atomic weight between 28 and 122 satisfied by —NCX groups where X is a chalcogen of atomic weight less than 33.

3. Process which comprises reacting, in an essentially anhydrous system, an organic compound having a plurality of groups containing active hydrogen with from 0.5 to 10%, based on the weight of said compound, of silicon tetraisocyanate.

4. Process for improving the properties of polymeric organic material having a plurality of groups containing active hydrogen which comprises reacting, in an essentially anhydrous system, the same at 20° C. to 200° C. with 0.5 to 10% of silicon tetraisocyanate.

5. Process for improving the properties of alkyd resins having a plurality of groups containing active hydrogen which comprises reacting, in an essentially anhydrous system, the same at 20° C. to 200° C. with 0.5 to 10% of silicon tetraisocyanate.

6. A product of the reaction, in an essentially anhydrous system, of an organic compound, said compound having a plurality of groups containing active hydrogen with from 0.5 to 10%, based on the weight of said compound, of silicon tetraisocyanate.

7. A polymeric organic product of the reaction, in an essentially anhydrous system, of an organic compound having a plurality of hydroxyl groups with from 0.5 to 10%, based on the weight of said compound, of silicon tetraisocyanate.

8. Process which comprises reacting, in an essentially anhydrous system, an organic compound having a plurality of groups containing active hydrogen with from 0.5 to 10%, based on the weight of said compound, of an inorganic silicon compound wherein all the valences of the silicon are satisfied by —NCX radicals wherein X is chalcogen of atomic weight less than 33.

9. Process for improving the properties of polymeric organic material having a plurality of groups containing active hydrogen which comprises reacting the same, in an essentially anhydrous system at 20° C. to 200° C., with 0.5 to 10% of an inorganic silicon compound wherein all the valences of the silicon are satisfied by —NCX radicals wherein X is chalcogen of atomic weight less than 33.

10. Process for improving the properties of alkyd resins having a plurality of groups containing active hydrogen which comprises reacting the same, in an essentially anhydrous system at 20° C. to 200° C., with 0.5 to 10% of an inorganic silicon compound wherein all the valences of the silicon are satisfied by —NCX radicals wherein X is chalcogen of atomic weight less than 33.

11. A polymeric organic product of the reaction, in an essentially anhydrous system, of an organic compound having a plurality of groups containing active hydrogen with from 0.5 to 10%, based on the weight of said compound, of an inorganic silicon compound wherein all the valences of the silicon are satisfied by —NCX radicals wherein X is chalcogen of atomic weight less than 33.

12. Process which comprises reacting, in an essentially anhydrous system, an organic compound having a plurality of groups containing active hydrogen with from 0.5 to 10%, based on the weight of said compound, of an inorganic compound wherein all the valences of an acidic-hydroxide-forming, inorganic, polyvalent element of groups IV to V of the periodic system and of atomic weight between 28 and 122 are satisfied by —NCX radicals wherein X is chalcogen of atomic weight less than 33.

13. Process which comprises reacting, in an essentially anhydrous system, a polymeric organic compound having a plurality of groups containing active hydrogen with from 0.5 to 10%, based on the weight of said compound, of an inorganic compound wherein all the valences of an acidic-hydroxide-forming, inorganic, polyvalent element of groups IV to V of the periodic system and of atomic weight between 28 and 122 are satisfied by —NCO radicals.

14. Process for improving the properties of polymeric organic material having a plurality of groups containing active hydrogen which comprises reacting the same, in an essentially anhydrous system at 20° C. to 200° C., with 0.5 to 10% of an inorganic compound wherein all the valences of an acidic-hydroxide-forming, inorganic, polyvalent element of groups IV to V of the periodic system and of atomic weight between 28 and 122 are satisfied by —NCX radicals wherein X is chalcogen of atomic weight less than 33.

15. Process for improving the properties of alkyd resins having a plurality of groups containing active hydrogen which comprises reacting the same, in an essentially anhydrous system at 20° C. to 200° C., with 0.5 to 10% of an inorganic compound wherein all the valences of an acidic-hydroxide-forming, inorganic, polyvalent element of groups IV to V of the periodic system and of atomic weight between 28 and 122 are satisfied by —NCX radicals wherein X is chalcogen of atomic weight less than 33.

16. Process which comprises reacting, in an essentially anhydrous system, an organic compound having a plurality of groups containing active hydrogen with from 0.5 to 10%, based on the weight of said compound, of an inorganic compound having, as its only carbon-containing groups and as its only reacting groups, a plurality of —NCX radicals directly attached to an acidic-hydroxide-forming, polyvalent, inorganic element of groups IV to V of the periodic system and of atomic weight between 28 and 122, the X of the —NCX radicals being chalcogen of atomic weight less than 33.

17. A polymeric organic product of the reaction, in an essentially anhydrous system, of an organic compound having a plurality of groups containing active hydrogen with from 0.5 to 10%, based on the weight of said compound, of an inorganic compound having, as its only carbon-containing groups and as its only reacting groups, a plurality of —NCX radicals directly attached to an acidic-hydroxide-forming, polyvalent, inorganic element of groups IV to V of the periodic system and of atomic weight between 28 and 122, the X of the —NCX radicals being chalcogen of atomic weight less than 33.

18. Process which comprises reacting, in an essentially anhydrous system, an organic compound having a plurality of groups containing active hydrogen with 0.5 to 10%, based on the weight of said compound, of an inorganic compound wherein all the valences of an acidic-hydroxide-forming, inorganic, polyvalent, element of groups IV to V of the periodic system and of atomic weight between 28 and 122 are satisfied by —NCO radicals.

HENRY CHARLES MILLER.
BURT CARLTON PRATT.

REFERENCES CITED

The following references are of record in the file of this patent:

UNITED STATES PATENTS

| Number | Name | Date |
|---|---|---|
| 1,482,076 | Fourneaux | Jan. 29, 1924 |
| 1,622,368 | Chavassieu | Mar. 29, 1927 |
| 2,086,419 | Hunt et al. | July 6, 1937 |
| 2,282,827 | Rothrock | May 12, 1942 |
| 2,331,276 | Pikl | Oct. 5, 1943 |

FOREIGN PATENTS

| Number | Country | Date |
|---|---|---|
| 512,160 | Germany | Nov. 5, 1930 |